(No Model.)
W. R. SANTLEY.
BELT SHIFTER.
No. 285,683. Patented Sept. 25, 1883.
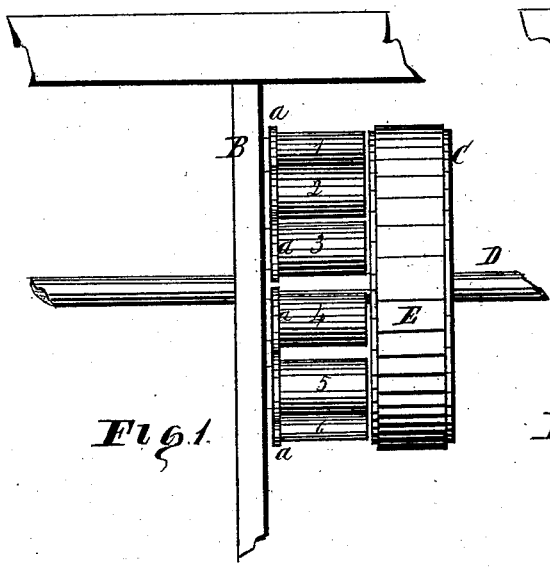
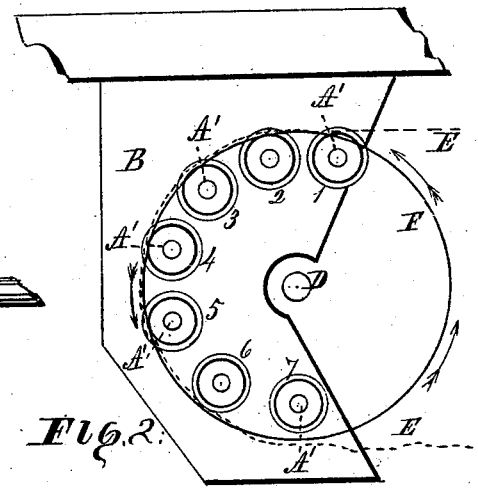
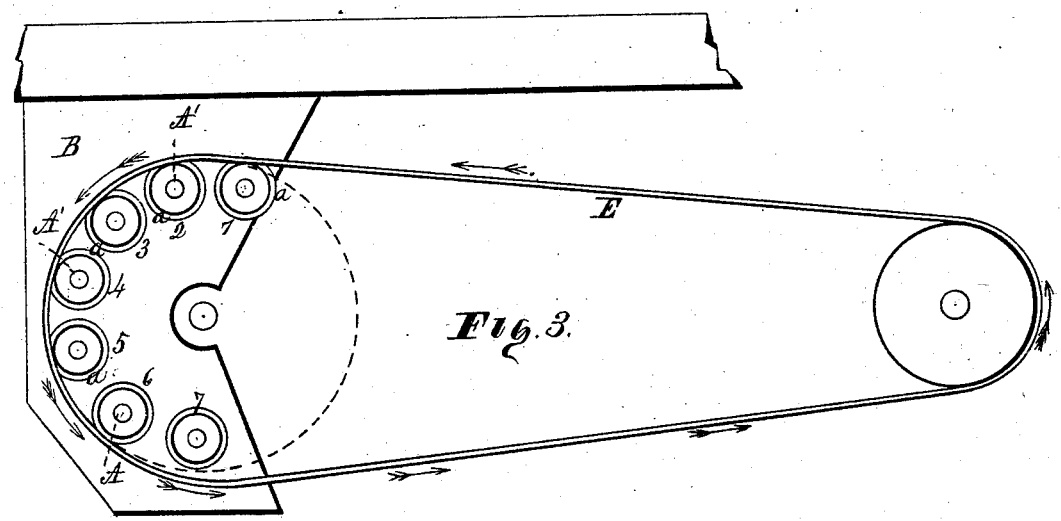
Witnesses:
J. H. Burridge
George Lull
Inventor:
W. R. Santley
W. H. Burridge
Atty.

UNITED STATES PATENT OFFICE.

WILLIAM R. SANTLEY, OF WELLINGTON, OHIO.

BELT-SHIFTER.

SPECIFICATION forming part of Letters Patent No. 285,683, dated September 25, 1883.

Application filed July 9, 1883. (No model.)

*To all whom it may concern:*

Be it known that I, WILLIAM R. SANTLEY, of Wellington, in the county of Lorain and State of Ohio, have invented new and useful Improvements in Belt-Shifters; and I do hereby declare that the following is a full and complete description thereof.

The nature of said invention relates to an arrangement of a series of rollers pivoted or supported at one end to a bracket or other equivalent support for the rollers. The other ends of the rollers are brought in close proximity with the pulley without any intermediate support. This admits of the belt being more quickly and easily shifted from the pulley to the rollers, and vice versa, which causes less strain and wear upon the belt than by the means employed in this class of shifters, and also saves the expense and wearing of an idle or loose pulley, usually a part of a belt-shifter.

The following description of the improved belt-shifter is illustrated by the annexed drawings, making a part of this specification, in which—

Figure 1 represents a face view of the improved belt-shifter and a working-pulley associated therewith. Fig. 2 is a side view of the belt-shifter. Fig. 3 is a side view of the belt-shifter connected to a pulley by a belt, supposed to run in the direction of the arrows.

Like letters of reference denote like parts in the several figures.

The belt-shifter above referred to consists of a series of rollers, 1, 2, 3, 4, 5, 6, and 7, which, however, may be more or less, as the size of the pulley and belt may require. Said rollers are secured to the side of a sustaining-plate, B, by means of pintles A', fixed in the plate and projecting therefrom, and upon which the said rollers are placed and revolve. Instead of a plate, a plank or a bent bar, or a bracket or hanger, may be used, in which to fix the pintles for the rollers, that they may be adjusted to and secured in proper relation to a driving-pulley, with which they are to be associated.

It will be observed that the pintles are supported at one end only; hence the rollers when placed thereon have their outer ends free or unsupported, save by the strength of the pintles, rigidly and firmly fixed in the sustaining plate, bar, or other suitable support for that purpose. It will also be noticed that the inner ends of the rollers are provided with a flange, $a$, and that the outer ends thereof have no flange, but are plain therefrom to the flange, as shown in Fig. 1, in which C represents a driving-pulley secured on the shaft D. On said pulley is a belt, E, corresponding to the belt E in Fig. 3.

It will be noticed in Fig. 2 that the several rollers 1 2 3 4, &c., are arranged in an arc of a circle, so that the face of the rollers will coincide with circumferential line of the pulley C, which in Fig. 2 is indicated by the line F, while the broken line indicates the belt E. The lower rollers, 6 and 7, are not in the same arc-line with the rollers above alluded to, but they have a shorter radius, so that they are within the circumferential line of the pulley, as shown in Figs. 2 and 3, the purpose of which will presently be shown.

The application of the above-described series of rollers for the purpose specified is as follows: Close to the side of the driving-pulley C, and unconnected with the shaft thereof, is rigidly secured the above-described series of rollers, which may be done by means of a hanger depending from the ceiling, to which the plate, plank, or bar of rollers may be made fast, or they may be attached to a post or to a bracket, as circumstances and convenience may determine, so that the plate or bar, or other member supporting the rollers, shall be arranged so as to place the arc of rollers in proper relation to the rim of the pulley, as shown in Fig. 1, in which it will be seen that the upper sides of the rollers are flush with the rim of the pulley, and the unflanged ends thereof in close proximity to the edge of the rim, there being nothing interposed between the free ends of the rollers and the edge of the rim of the pulley. The belt E, supposed to be running in the direction of the arrows, can be easily and readily shifted from the driving-pulley C onto the rollers either by the hand or by an ordinary shifting-bar. (Not shown in the drawings.) The ends of the rollers being so near the edge of the pulley and flush with the face thereof, and also being free to revolve, allow the belt to run with ease and facility from the pulley onto the rollers 1 2 3 4 5, &c., upon which it remains, but ceases to run. At the same time the tension is taken out of the belt by the position of the rollers 6 and 7, which, being nearer to the axial line of the pulley than are the rollers above them, produces a slack in the belt, causing it to hang loosely from the rollers above, as shown in the drawings, thereby avoiding the continued tension and wearing of the belt—the result of being shifted onto a loose pulley in the ordinary way.

I wish it to be understood that I do not confine myself to any one particular way of fixing the pintles in a supporting plate, bar, or other supporting member, nor to the size and shape of them, nor to the size and number of the rollers above specified.

It will be proper to remark here that when a belt runs in the opposite direction of the arrows, the same arrangement of rollers will be required, but reversed in position. The upper arrangement of rollers should be flush with the face of the pulley onto which the belt may run, in order to lead it from the driving-pulley, while the rollers 6 and 7 retain their same relation to the axial line of the pulley and to the other rollers, but facing in the opposite direction from that shown in the drawings.

What I claim as my invention, and desire to secure by Letters Patent, is—

A belt-shifter composed of rollers having one end free, and supported on pintles attached at one end only to a frame or plate, substantially as described, one portion of the rollers being arranged on an arc of a circle coincident with the circumference of the pulley, and the other rollers on an arc of larger radius, substantially as and for the purpose described.

In testimony whereof I affix my signature in presence of two witnesses.

WILLIAM R. SANTLEY.

Witnesses:
D. A. WILLARD,
W. H. SCHNEIDER.